Feb. 19, 1924.  
W. R. UHLEMANN  
OPTICIAN'S ANGLE GAUGE  
Filed March 6, 1922  
1,484,365
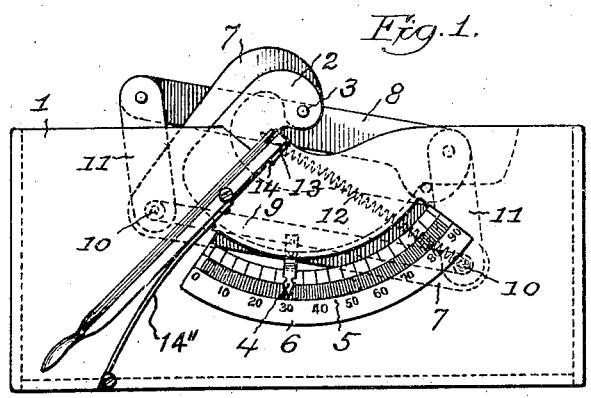
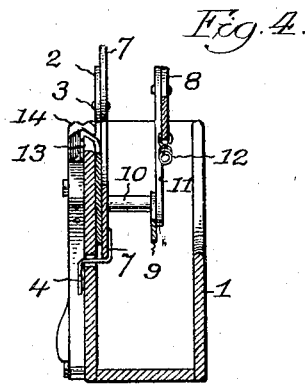
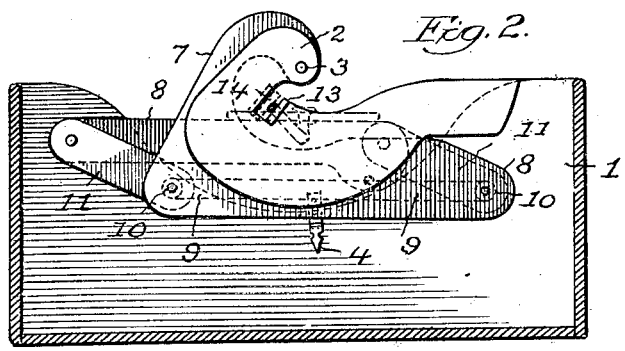
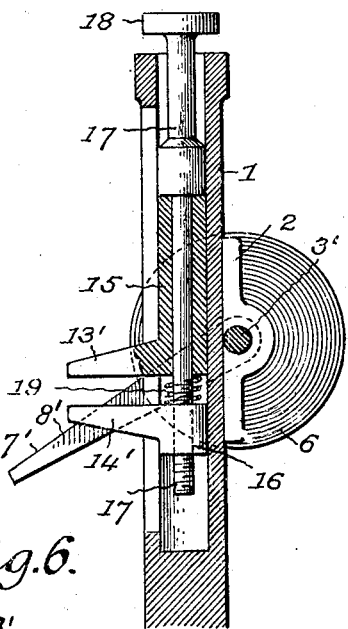
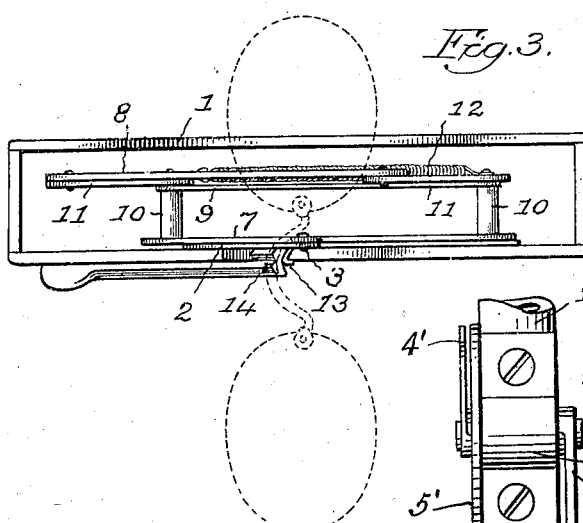
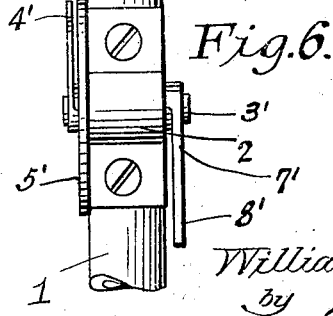
Witness:  
John Enders
Inventor:  
William R. Uhlemann,  
by Robert Burns,  
Atty.

Patented Feb. 19, 1924.

1,484,365

UNITED STATES PATENT OFFICE.

WILLIAM R. UHLEMANN, OF EVANSTON, ILLINOIS, ASSIGNOR TO UHLEMANN OPTICAL COMPANY, OF CHICAGO, ILLINOIS, A CORPORATION OF ILLINOIS.

OPTICIAN'S ANGLE GAUGE.

Application filed March 6, 1922. Serial No. 541,274.

*To all whom it may concern:*

Be it known that I, WILLIAM R. UHLEMANN, a citizen of the United States of America, residing at Evanston, in the county of Cook and State of Illinois, have invented a certain new and useful Improvement in Opticians' Angle Gauges, of which the following is a specification.

This invention relates to testing instruments for use by opticians in fitting and adjusting the nose bridges of eyeglass frames so that the bearing surface of such bridge will be at a predetermined angle to the plane of the lenses and an accurate and comfortable fit of the eyeglasses attained. The present improvement is intended as a companion and auxiliary to the opticians' angle measurers which forms the subject matter of my companion application for Letters Patent, Serial No. 541,273, filed Mar. 6, 1922, and is used in the final fitting and adjustment of eyeglass frames after the required angular relation of the resting surface of the nose bridge to the lens rings has been determined by said measurer.

The object of the present improvement is to provide a structural formation and association of gauge parts whereby, as the plane of the resting surface of the nose bridge of an eyeglass frame from a stock supply is, by a series of manually effected bends brought to the desired angular relation to the plane of the lenses or lens holding rings, the progress attained after such successive operation can be accurately gaged and determined, until the desired annular relation of the parts is attained and indicated, all as will hereinafter more fully appear.

In the accompanying drawing:

Fig. 1, is an elevation of the exterior of the preferred type of the instrument, showing the indicating dial and the visible portions of the mechanism.

Fig. 2, is an elevation with the dial carrying wall removed and with the transverse walls of the casing in section.

Fig. 3, is a top view of the structure.

Fig. 4, is a central transverse sectional elevation.

Fig. 5, is a sectional elevation of a modified type of the invention.

Fig. 6, is a detail elevation of the construction shown in Fig. 5.

Like reference numerals indicate like parts in the several views.

Referring to the drawing, 1 designates the frame or support of the instrument, which may be of the open shell form shown in Figs. 1 to 4 inclusive, of the footed tubular standard type shown in Fig. 5, or of other usual and suitable form.

2 designates a journal bracket extension on the support 1, providing a bearing for the transversely arranged pivot shaft or spindle 3 of the mechanism.

4 designates an indicating finger or pointer fixedly associated with the shaft 3 and moving over a graduated scale 5 on a scale plate 6 of the support 1.

7 designates a swinging arm fixedly attached at one end to the pivot shaft 3, which arms in the preferred form of the invention shown in Figs. 1 and 2 is of a curved or irregular angular form in order to afford clearance in an extending range of movement of the arm with relation to the eyeglass frame undergoing the gaging operation. Intermediate its length the main branch of the arm 7 carries the finger or pointer 4 above described, and in the preferred construction the arm 7 constitutes a carrier for the trial bar or straight edge 8 of the instrument, with said trial bar yieldingly connected to said arm and preferably in the manner hereinafter described, and so that with a turning movement of the parts to bring said trial bar 8 in surface contact with the face of either the lens or of the lens ring of an eyeglass frame, an indication is had by means of the associated pointer 4 and scale 5 of the nearness reached to the desired angle of such lens or lens ring surface in relation to the bearing surface of the nose bridge of the eyeglass frame as hereinafter more fully set forth.

In the modified form of the invention shown in Fig. 5, the swinging arm 7' is of a straight rail form fixedly attached to a main shaft or spindle 3' and formed with a straight edge 8' which in a swinging movement of the parts to bring the edge 8' into surface contact with the face of the lens or the lens ring of an eyeglass frame is adapted to indicate in the manner above described the nearness reached to the desired angle of the nose bridge or lens or lens ring after each adjusting or bending operation. The pointer 4' and graduated scale 5' of the modified construction as shown in Fig. 6, is substantially the same as that shown in Fig. 1, with the pointer connected directly to the shaft 3'.

9 designates a bar or rail arranged in spaced and parallel relation to the main branch of the swinging arm 7 aforesaid, and carried by stay posts or lugs 10, to constitute a fixed lateral extension of said arm.

11 designates radius links connecting the trial bar or straight edge 8 of the preferred construction to the respective ends of the bar or rail 9 and adapted to impose parallel movement on the trial bar with relation to the points of pivotal connection of the links 11 to the bar or rail 9.

12 designates a tension spring interposed between the trial bar 8 and the rail 9 with a tendency to draw said trial bar in a direction away from said rail.

13 designates a rest or jaw, which in the preferred construction shown in Figs. 1 and 3, is fixedly secured to the support 1 in adjacent relation to the pivot shaft 3 and is adapted to afford a fixed rest or support for the bearing surface of the nose bridge of an eyeglass frame which is undergoing adjustment to hold said resting surface of the nose bridge on a predetermined plane with relation to a given graduation of the scale or index 5 aforesaid.

14 designates a companion movable or clamping jaws, preferably pivoted on the support 1 and having an associated spring 14'' the tendency of which is to force the jaw 14 towards the jaw 13 and clamp the nose bridge in place between the jaws as above set forth.

In such preferred construction the holding jaws 13, 14 have a fixed relation to the support 1 and pivot shaft 3, and the shifting in actual use of the trial bar 8 to and from the shaft 3 is of a resilient nature under the influence of the spring 12 and links 11 aforesaid.

In the modified construction shown in Fig. 5, the holding jaws 13' 14' are adjustably connected together in manner hereinafter described, and as distinguished from the preferred construction above set forth, have vertical sliding movement in the support 1 to and from the pivot shaft 3' by a structural formation as follows:—

15, 16 designate cylindrical heads formed to slide in the vertical bore of the support 1 and carrying on their adjacent ends holding jaws 13' 14' which project laterally through a side slot in the support 1 and beyond the same, to receive and hold the nose bridge of an eyeglass frame.

17 designates an operating stem journalled axially in the upper head 15 aforesaid and having at its upper end an operating head or handle 18 for convenient manual rotation, while its lower end is screw-threaded and has operative engagement in a screw-threaded orifice in the lower jaw 16 to move the holding jaws towards or away from each other in effecting engagement with or disengagement from an eyeglass frame undergoing adjustment.

19 designates a spring interposed between the heads 15, 16 with a resilient tendency to force the same away from each other.

It is within the scope of the invention to duplicate the trial bar or straight edge 8 or 8' and its mountings at each side of the holding jaws, in order that trial bearings may be had simultaneously with the surface of both lenses or both lens rings of an eyeglass frame when such result is found necessary or desirable.

The details of the operation of the instrument is set forth in connection with the description of the formation and arrangement of the parts and briefly stated is as follows:—

The desired angle at which the surface of the lenses or lens rings with relation to the bearing surface of the nose bridge of an eyeglass frame having been ascertained by a measuring instrument such as set forth in my aforesaid companion application Serial No. 541,273, the nose bridge of the frame to be fitted or adjusted is inserted between and clamped between the holding jaws 13, 14 or 13' 14' after which a twisting of the connecting portions of the nose bridge is effected by any usual means, during which twisting operation the trial bar or straight edge 8 or 8' is from time to time used to ascertain the nearness which is reached to the required angle of the face of the lenses or of the lens rings in relation to the bearing surface of the nose bridge of eyeglass frame operated on.

Having thus fully described my invention what I claim as new and desire to secure by Letters Patent, is:—

1. In a testing instrument for use in adjustment of parts to attain a required angular relation between the bearing surface of the nose bridge and the face of the lens supporting rings of an eyeglass frame, the combination of a support carrying an index dial, a pair of holding jaws and an arm carrying a trial edge mounted in operative relation on said support in manner to permit of relative movement to and from each other, said arm having pivotal attachment to its mounting, and a pointer turning in unison with said arm and in indicating relation to the dial aforesaid.

2. In a testing instrument for use in an adjustment of parts in attaining a required angular relation between the bearing surface of the nose bridge and the face of the lens supporting rings of an eyeglass frame, the combination of a support carrying an index dial and a pair of holding jaws, a movable arm having a portion forming a trial edge, an intermediate means forming a pivotal connection for the movable arm to the support and adapted to permit movement of the trial edge portion of the movable arm to and from said holding jaws, and a pointer turning in unison with the movable arm in indicating relation to the dial aforesaid.

3. In a testing instrument for use in an adjustment of parts in attaining a required angular relation between the bearing surface of the nose bridge and the face of the lens supporting rings of an eyeglass frame, the combination of a support carrying an index dial and a pair of holding jaws, a movable arm having a portion forming a trial edge, an intermediate means forming a pivotal connection for the movable arm to the support and adapted to permit movement of the trial edge portion of the movable arm to and from said holding jaws, and a pointer turning in unison with the movable arm in indicating relation to the dial aforesaid, the movable arm having a curved form adjacent to its point of pivotal connection to afford clearance past the holding jaws.

4. In a testing instrument for use in an adjustment of parts in attaining a required angular relation between the bearing surface of the nose bridge and the face of the lens supporting rings of an eyeglass frame, the combination of a support carrying an index dial, holding jaws arranged on said support, a movable arm having its pivotal connection adjacent to said jaws and comprising a main arm, a straight edge or bar, radius links connecting the straight edge to the main arm, a spring tending to move said straight edge in a direction away from the main arm; and a pointer moving in unison with the movable arm in indicating relation to the dial aforesaid.

5. In a testing instrument for use in an adjustment of parts in attaining a required angular relation between the bearing surface of the nose bridge and the face of the lens supporting rings of an eyeglass frame, the combination of a support carrying an index dial, holding jaws arranged on said support, a movable arm having its pivotal connection adjacent to said jaws and comprising a main arm, a straight edge or bar, radius links connecting the straight edge to the main arm, a spring tending to move said straight edge in a direction away from the main arm, and a pointer moving in unison with the movable arm in indicating relation to the dial aforesaid, the movable arm having a curved form adjacent to its point of pivotal connection to afford clearance past the work in the holding jaws.

6. In a testing instrument for use in an adjustment of parts in attaining a required angular relation between the bearing surface of the nose bridge and the face of the lens supporting rings of an eyeglass frame, the combination of a support carrying an index dial, holding jaws arranged on said support, a movable arm having its pivotal connection adjacent to said jaws and comprising a main arm having a secondary bar in spaced relation, a straight edge or bar, radius links connecting the straight edge to the secondary bar, a spring tending to move said straight edge in a direction away from said secondary bar, and a pointer moving in unison with the movable arm in indicating relation to the dial aforesaid.

7. In a testing instrument for use in an adjustment of parts in attaining a required angular relation between the bearing surface of the nose bridge and the face of the lens supporting rings of an eyeglass frame, the combination of a support carrying an index dial, holding jaws arranged on said support, a movable arm having its pivotal connection adjacent to said jaws and comprising a main arm having a secondary bar in spaced relation, a straight edge or bar, radius links connecting the straight edge to the secondary bar, a spring tending to move said straight edge in a direction away from said secondary bar, and a pointer moving in unison with the movable arm in indicating relation to the dial aforesaid, the movable arm having a curved form adjacent to its point of pivotal connection to afford clearance past the work in the holding jaws.

Signed at Chicago, Illinois, this 1st day of March, 1922.

WILLIAM R. UHLEMANN.